United States Patent [19]
Stotesbery

[11] 3,743,316
[45] July 3, 1973

[54] PROTECTIVE DEVICE FOR SNOWMOBILES

[76] Inventor: Gerald L. Stotesbery, 503 South Hill Street, La Crescent, Minn.

[22] Filed: Dec. 19, 1969

[21] Appl. No.: 886,709

[52] U.S. Cl............280/150 R, 180/5 R, 280/150 C
[51] Int. Cl............................................B60r 21/02
[58] Field of Search..........280/150 R, 150 C, 150 B; 30/123, 273, 286; 296/102, 104; 180/5

[56] References Cited
UNITED STATES PATENTS

| | | | |
|---|---|---|---|
| D216,784 | 3/1970 | Martinmaas | 180/5 |
| 2,441,132 | 5/1948 | Blakey | 280/150 F X |
| 3,552,514 | 1/1971 | Alpers | 180/5 |
| 1,122,742 | 12/1914 | Halbach | 280/150 UX |
| 1,614,856 | 1/1927 | Overbeck | 280/150 R |
| 1,305,515 | 6/1919 | Bessolo | 296/102 |
| 1,107,832 | 8/1914 | Palis | 280/150 R |
| 2,565,746 | 8/1951 | Turner | 296/104 |

Primary Examiner—Benjamin Hersh
Assistant Examiner—Robert R. Song
Attorney—Williamson, Palmatier & Bains, George F. Williamson, H. Dale Palmatier and Herman H. Bains

[57] ABSTRACT

A safty device for a snowmobile takes the form of an upright bar supported in front of the windshield and extending upwardly over the top edge of the windshield in position to engage obstacles such as low hanging tree limbs and fence wire to prevent such obstacles from striking and injuring the persons riding on the snowmobile. In one preferred form, the upright bar terminates at its upper end at a forwardly facing hook adapted to catch obstructions of the aforesaid type so that they do not pass over the windshield and strike the snowmobile riders, a cutting edge on the hook serving to sever strands of fence wire and relatively small branches and limbs.

1 Claim, 8 Drawing Figures

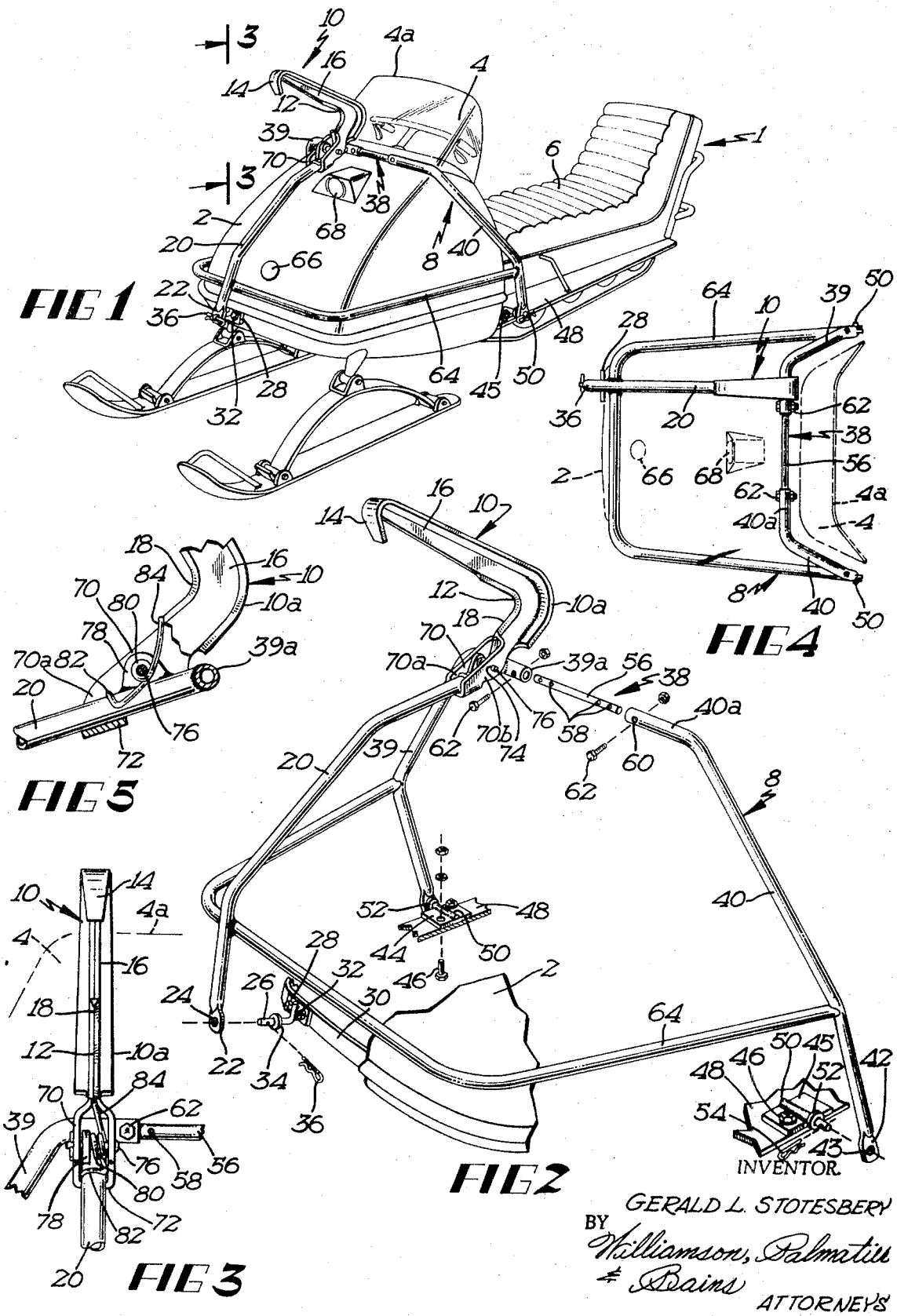

3,743,316

PROTECTIVE DEVICE FOR SNOWMOBILES

BRIEF SUMMARY OF THE INVENTION

The widespread use of snowmobiles has given rise to a safty problem caused by potentially hazardous and lethal obstructions such as barbed wire fences and tree limbs. It is not uncommon for the driver and passengers of snowmobiles to ride in a kneeling or crouched position with their heads projecting up over the top of the snowmobile windshield. If, because of poor visibility or night time driving, the snowmobile drives into fence or low hanging tree limb at a relatively high speed, the occupants are very susceptible to being struck by a wire strand or limb which might either clear the windshield or slide up over the top thereof. Such accidents are occuring with alarming frequency.

It is, therefore, the primary objective of this invention to provide a protective device constructed and arranged on a snowmobile in such a way as to either deflect or sever potentially injurious obstructions such as fence wire and low hanging tree branches so that they do not strike the persons on the snowmobile.

In one form of my invention, this basic objective is realized by utilizing mounting bars secured to the snowmobile frame to support a rigid, forwardly facing hooked member in front of the snowmobile windshield in an upright position, preferably with at least a portion of the hook extending above the top of the windshield. Wire strands, cables, and tree limbs at such a level that they might otherwise strike the riders on the snowmobile by clearing the windshield or sliding rearwardly thereover, are caught by the hooked member. A cutting edge at the base of the hooked member serves to sever fence wire and relatively small branches or limbs.

As a particularly advantageous feature of my invention, the aforesaid hooked member is pivotally secured to a support bar in such a way that it may pivot forwardly, but not rearwardly, in the event that a snowmobile strikes a non-breakable obstruction such as a heavy cable, and is quickly brought to a stop. If the sudden stop causes one of the riders to be thrown over the windshield onto the hooked member, the hook will collapse or pivot forwardly to prevent serious injury to the rider.

A further beneficial aspect of my invention resides in the mounting of the aforesaid hooked member on the inner end of an elongated, rigid bar which extends forwardly over the snowmobile hood from the windshield and is secured to the lower, front end of the snowmobile, thereby serving to deflect low lying obstructions upwardly and rearwardly over the hood into the hooked member.

An alternative version of my protective device advantageously takes the form of a roll bar frame structure including a deflector bar overlying the hood, a cross bar connected thereto and extending transversly over the windshield and one or more roll bars extending rearwardly from the cross bar over the top of the snowmobile to points of connection at the rear end thereof. The purpose of this roll bar structure is to prevent the riders on the snowmobile from being crushed by the snowmobile in the event that it should turn over.

These and other objects and advantages of my invention will become readily apparent as the following description is read in conjunction with the accompanying drawings, wherein like reference numerals have been used to designate like elements throughout the several views.

BRIEF DESCRIPTION OF THE DRAWINGS

FIG. 1 is a front, perspective view of a snowmobile showing one embodiment of my protector device, including a hooked member in front of the windshield;

FIG. 2 is a perspective view showing the manner of mounting the protective device of FIG. 1 on a snowmobile;

FIG. 3 is a front, elevation view of the protective device of FIG. 1;

FIG. 4 is a top, plan view of the protective device of FIG. 1;

FIG. 5 is a vertical section view taken along lines 5 — 5 of FIG. 3 and showing the manner of connecting the hooked member of the device of FIG. 1 to a support bar;

DESCRIPTION OF THE PREFERRED EMBODIMENTS

Figure 6:
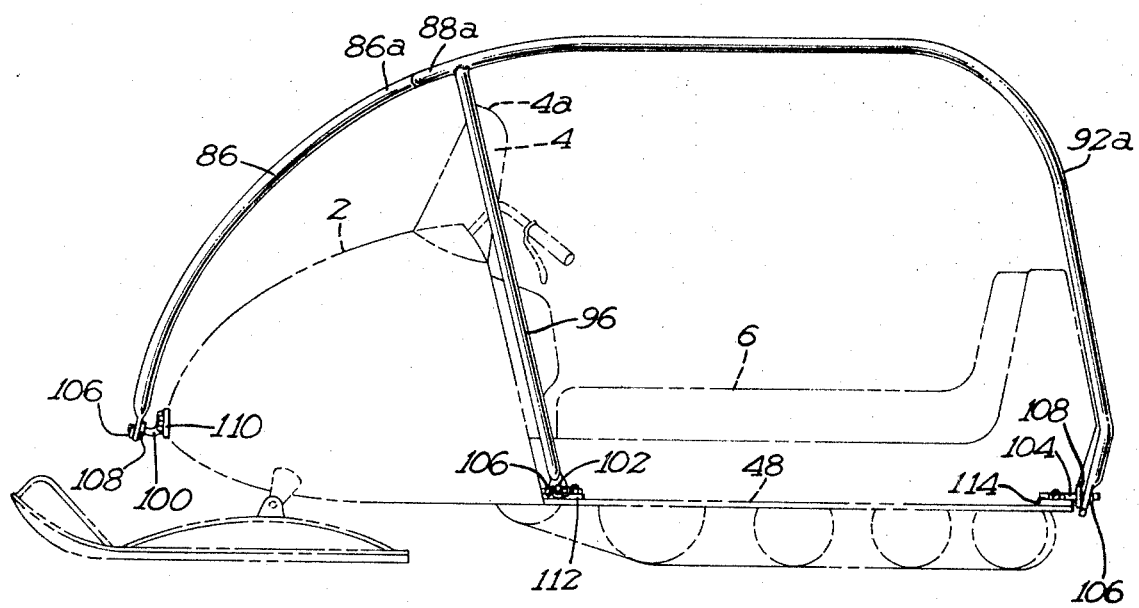
FIG. 6 is side, elevation view of a modified form of my invention incorporating a roll bar frame extending over the top of the snowmobile.

The protective device of this invention has been particularly designed with a view towards its quick and easy mounting on a snowmobile in such a way as to provide maximum protection to the riders on a snowmobile from obstructions while presenting a minimum amount of interference with the line of sight of the driver. In FIGS. 1 through 5, I have shown one, preferred embodiment of my invention wherein these objectives have been realized. In FIG. 1 there is shown a snowmobile of conventional design which has been generally designated by reference numeral 1. Snowmobile 1 includes a forward hood 2 which covers the snowmobile engine and a windshield 4 which projects upwardly from the rear end of hood 2. Seat 6 accomodates the driver and passengers behind windshield 4. The design of most snowmobiles is such that, even when riding in a seated position, the driver and passengers heads may well project at least partially above the top edge 4a of windshield 4; and, when riding in a kneeling position, as is quite common, the entire neck and heads of the riders will extend above the top edge 4a of windshield 4. Thus, if the snowmobile is accidentally driven into a low obstruction such as a wire fence, a tree limb or horizontally extending cable, such an obstruction could either clear top edge 4a of windshield 4, or slide rearwardly thereover and strike the riders with resultant injury or death.

The protective device of this invention has been developed to prevent such accidents, and in the form shown in FIGS. 1 through 5 comprises a frame assembly generally indicated by reference numeral 8 and including at least a portion thereof which projects upwardly above top edge 4a of windshield 4 to prevent hazardous obstructions from striking the riders on the snowmobile. In the embodiment of my invention shown in FIGS. 1 through 5, this upwardly extending portion takes the form of a hooked member 10 which opens towards the front end of the snowmobile. Hooked member 10 is preferably formed from rigid, non-yielding material such as steel, and in the V-shape shown includes a base portion 12 adapted to catch strands of fence wire, low hanging limbs, etc. The flat, steel stock from which member 10 is formed, has a downwardly and inwardly turned extension tab 14 at its upper end which is intended to prevent strands of wire, cable or tree branches from being released by hooked member 10 and snapping rearwardly into the faces of the driver and passengers on snowmobile 1. Welded to the flat, metal backing strip 10a of hooked member 10 at substantially right angles thereto is a strengthening and cutting plate 16. A beveled cutting edge 18 is preferably formed on plate 16 at base portion 12 of hooked member 10.

Frame assembly or structure 8 serves as a support means for hooked member 10 and holds said hooked member at a position over hood 2 in front of windshield 4 in the manner shown in FIGS. 1 and 4. Frame assembly 8 includes as a portion thereof an elongated, rigid bar 20, to the upper end of which, hooked member 10 is secured in a manner hereinafter described. Rigid bar 20 extends forwardly and downwardly from hooked member 10 in overlying relation to hood 2 and terminates at its lower end at a point of connection to the lower, front end of snowmobile 1. As may be clearly noted with respect to FIGS. 3 and 4, hooked member 10 projects upwardly from the upper end of rigid bar 2 and lies in the same vertical plane therewith, whereby low lying obstructions, such as wire fence strands will be deflected upwardly and rearwardly over bar 20 and into base 12 of hooked member 10. Bar 20 is provided at its lower end with a flattened end portion 22 having an aperture 24 therein for removable attachment to a forwardly projecting pin 26. A mounting plate 28 is attached to front frame member 30 of the snowmobile by means of removable fasteners 32 extending through the lower end of hood 2. Mounting pin 26 for support bar 20 is secured to plate 28, preferably by welding. Apertured end 22 of rigid bar 20 is secured to pin 26 by sliding it rearwardly thereover against fixed stop collar 34, and then inserting spring clip 36 through an aperture in the outer end of pin 26 to hold flattened end 22 of bar 20 in place on pin 26.

Frame assembly 8 is further comprised of a generally U-shaped mounting bar structure having a laterally extending portion 38 and a pair of support legs 39 and 40 depending downwardly and rearwardly from the opposite ends thereof. Support legs 39 and 40 are so angularly oriented with respect to laterally extending portion 38 that they will project substantially in vertical planes when frame assembly 8 is mounted on a snowmobile in the manner shown, with portion 38 extending horizontally. Outer end portions 41 and 42 of legs 39 and 40 having apertures 43 therein permit the removable attachment of legs 39 and 40 on mounting means similar to that provided for front support bar 2. The mounting means for support legs 39 and 40 are provided on the lower, body structure of the snowmobile, and preferably comprise mounting plates 44 and 45, most clearly shown in FIG. 2, which are attached by bolts 46 to running boards 48 on the opposite sides of the snowmobile. Mounting pins 50 having stop collars 52 fixed thereto, as by welding, are welded to mounting plates 44 and 45. End portions 41 and 42 of support legs 39 and 40 are removably secured to mounting pins 50 by being pulled inwardly thereover and held in place thereon by spring clips 54 in the same manner described above with respect to the attachment of lower end 22 of bar 20 to mounting pin 26. Laterally extending portion 38 of frame assembly 8 is preferably comprised of a central coupling member in the form of a rigid, bar section 56 having a plurality of apertures 58 therein. Bar section 56 may be selectively attached to upper, horizontally extending end portions 39a and 40a of support legs 39 and 40 by forcing said tubular end portions 39a and 40a inwardly over coupling member 56, aligning selected ones of said apertures 58 with complementary apertures 60 in end portions 39a and 40a and inserting bolts 62 therethrough. The lateral extension of horizontal portion 38 of frame assembly 8 can thus be adjusted to permit the mounting of my protective device on snowmobiles of various widths by forcing support legs 39 and 40 inwardly a greater or lesser degree to thereby align apertures 60 therein with either the inner or outer apertures 58 at the opposite ends of coupling member 56.

Frame assembly 8 may optionally include lower, horizontally extending bars 64 which are welded at their outer ends to legs 39 and 40 and at their inner ends to the lower end of front support bar 20. Bars 64 serve to further reinforce the frame assembly, and in their position of overlying relation to the lower end of hood 2 serve additionally as bumper devices to protect the front end of the snowmobile. It is to be noted that unitary strength and rigidity is given to frame assembly 8 by welding the upper, inner end of front support bar 20 to horizontally extending, upper end portion 39a of support leg 39, this point of connection being shown most clearly in FIGS. 2 and 5.

It is important to note, with respect to FIGS. 3 and 4, that front support bar 20 and hooked member 10 secured thereto, are laterally offset to one side of frame assembly 8, whereby these structural elements will be positioned at one side of hood 2 and windshield 4 when the frame assembly is mounted on a snowmobile. This arrangement offers several advantages. First of all, and probably most important, it serves to position upwardly projecting hooked member 10 at one side of windshield 4 at a location where it will not unduly interfere with the line of vision of the driver, who will normally be seated directly behind the center of windshield 4. Also, by locating forward support bar 20 at one side of frame structure 8, I avoid having support bar 2 extend directly over gasoline tank filler cap 66 and headlight 68, which are normally located in the center of hood 2. In this way, any possible interference of the frame structure with the use and operation of gasoline filler cap 66 and headlight 68 is precluded.

In order to prevent potentially injurious obstructions from passing rearwardly over the top edge 4a of windshield 4, hooked member 10 preferably extends upwardly to a height as shown in FIG. 3 wherein its upper end projects above top edge 4a of windshield 4. Thus, any strand of fence wire or a tree limb at a level where it would otherwise just clear windshield 4 or strike windshield 4 and be deflected rearwardly thereover and strike the riders, would be caught by hooked member 10. Relatively low lying obstructions will be engaged by the lower end of front support bar 20 and guided rearwardly by bar 20 into base portion 12 of hooked member 10. In this manner, support bar 20 serves to protect the front end or nose portion of hood 2 of the snowmobile in addition to acting as a guide member to direct obstructions into hooked member 10. Articles such as fence wire and relatively small tree limbs and branchs will be cut or broken by cutting edge 18 of hooked member 10 if the snowmobile is moving at a relatively high rate of speed. Heavier, non-severable obstructions such as large tree limbs or heavy cables which might be disposed across the path of a snowmobile would be caught by hooked member 10 if located at a level below the top thereof, but quite likely would not be broken or cut by cutting edge 18. The result would be that, even though such an obstruction might yield, it would quickly bring the snowmobile to a halt. In such an event, there is always the possibility that one of the snowmobile riders might be thrown over the top of windshield 4 by the sudden deceleration of the vehicle. Here again, the positioning of hooked member 10 at one side of the snowmobile hood rather than directly in the center thereof is of particular advantage in that it lessens the likelihood that a rider being thrown over the top edge 4a of windshield 4 will strike the upper end of hooked member 10 projecting above the top of windshield 4 and be injured thereby.

In order to further lessen the possibility of a person being injured by striking hooked member 10 upon being thrown over the top of windshield 4, hooked member 10 is pivotally mounted on the upper end of forward support bar 20 in such a way that it may collapse forwardly. Referring now to FIGS. 2, 3 and 5, I have provided hooked member 10 with a bifurcated lower end portion 70 comprised of opposed, spaced apart ears 70a and 70b connected together at their outer ends by a cross brace 72 which extends under support bar 20 with member 10 mounted thereon in the manner shown in FIGS. 1 and 2. Aligned apertures 74 in opposed ears 70a and 70b of bifurcated end 70 of hooked member 10 accomodate a pivot pin 76, which also extends through an upright pivot boss 78 which is welded, or otherwise securely attached to the upper surface of support bar 20. Spring 80 is coiled around pivot pin 76, and has a lower leg 82 curved to conform to the contour of support bar 20 and resting thereagainst. Upper leg 84 of spring 80 bears against the upper end of bifurcated end portion 70 of hooked member 10, and urges hooked member 10 in a rearward direction about pivot pin 76. The rearward, pivotal movement of hooked member 10 is limited by the engagement of connecting segment 72 of bifurcated end portion 70 with the underside of support bar 20, whereby hooked member 10 is restrained in the normal position of use shown in view 1 and 2. If a passenger is thrown against hooked member 10 by a sudden stop of the snowmobile, hooked member 10 will pivot forwardly about the horizontal axis defined by pivot pin 76 against the resistance of spring 80. The forward collapsing or yielding of hooked member 10 will thus greatly lessen the possibility of a person being injured by contact therewith.

Although I have shown and described the preferred embodiment of hooked member 10 wherein its upper edge projects above the top edge 4a of windshield 4, it would of course also be possible to construct and mount hook 10 in such a way that its upper end terminates at a level only part way up the face of windshield 4. Such an arrangement would be more desirable from a standpoint of appearance, and would interfere less with the vision of the driver. However, a certain degree of safty would be sacrificed since it would then be possible for obstructions in the path of the snowmobile at a level above the top of the hooked member to clear the top edge 4a of windshield 4 and strike the passengers.

As another variation of the protective guard device shown in FIGS. 1 through 5, a pair of hooked members could be supported on opposite sides of the front end of the snowmobile, forwardly of the windshield, in place of the single hooked member 10 located directly in front of the snowmobile windshield. In this modified version a hooked member would be located on each side of the windshield, forwardly of the rear edge of the windshield, and opening forwardly in the same manner as hooked member 10. This arrangement would have the advantages of presenting even less of an obstruction to the forward visability of the driver, as well as presenting less of a hazard to a rider who might be thrown over the top of the windshield. Moreover, the pair of side mounted safty hooks would provide protection for the riders on the snowmobile if the snowmobile strikes an object, such as a wire fence, at an angle or from the side, rather than straight on.

Figure 7:
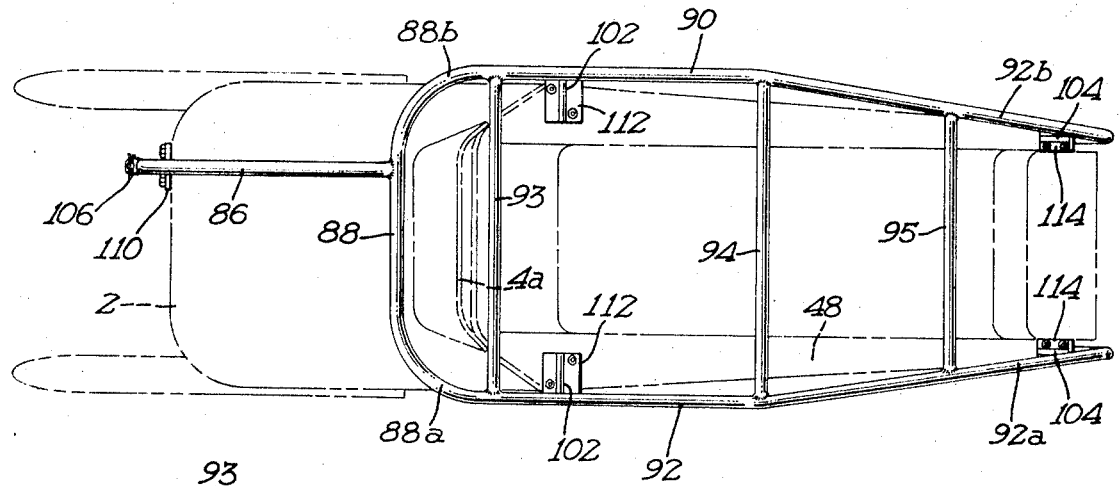
FIG. 7 is a top, plan view of the protective, roll bar device of FIG. 6.
Figure 8:
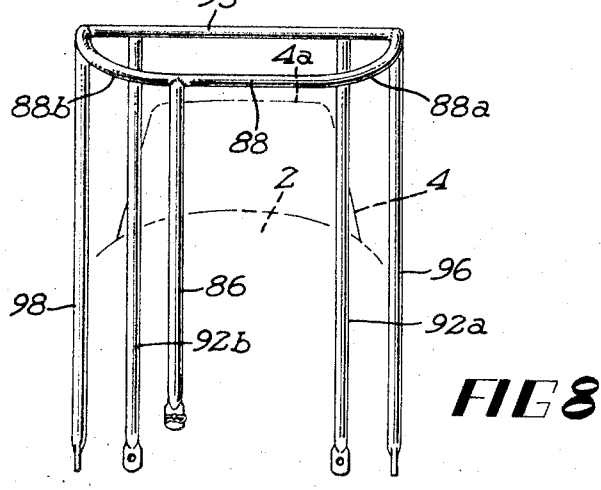
FIG. 8 is a front, elevation view of the device of FIG. 6.

In FIGS. 6, 7 and 8, I have shown an alternative embodiment of my protective device for a snowmobile which takes the form of a frame structure including one or more bar segments which extend lengthwise over the top of the entire passenger section of the snowmobile, thereby serving a roll bar function. In this embodiment, the protective frame structure is comprised of a plurality of bar segments, preferably tubular steel or aluminum as in the embodiment of FIGS. 1 through 5. The frame assembly includes a rigid, elongated front support bar 86 which extends lengthwise over hood 2 from a point adjacent the lower, front end of the snowmobile upwardly to a point of connection with a transversly extending bar segment 88. The upper end portion 86a of front support bar 86 is located above and in front of windshield r, as is cross brace 88, to provide maximum protection for the riders on the snowmobile in a manner hereinafter explained. Transverse bar section 88 includes rearwardly curved outer end portions 88a and 88b which extend rearwardly to a point of connection with rearwardly projecting support bar means in the form of a pair of overhead roll bars 90 and 92. Roll bars 90 and 92 extend rearwardly over the passenger seat 6 of the snowmobile and are removably attached to the lower, rear end portion of the snowmobile by means of downwardly depending support leg segments 92a and 92b. The roll bar structure includes a plurality of cross braces 93, 94 and 95 which are secured between laterally spaced roll bars 90 and 92, as is clearly shown in FIG. 7. Roll bars 90 and 92 are preferably located along the opposite sides of the snowmobile in the laterally spaced arrangement shown in FIG. 7. In order to further strengthen and rigidize the frame assembly of FIGS. 6, 7 and 8, I preferably provide an additional pair of support legs in the form of bar segments 96 and 98 on the opposite sides of the snowmobile. Support lets 96 and 98 welded, or otherwise secured, to curved end portions 88a and 88b of transverse bar segment 88 and depend downwardly and rearwardly therefrom to points of connection to the lower body or frame portion of the snowmobile.

The mounting means for removably securing each of the support bars 86, 96, 98, 92a and 92b to the snowmobile is the same as that employed for support bars 20, 39 and 40 of the embodiment of my invention shown in FIGS. 1 through 5. For that purpose, each of the support bars 86, 96, 98, 92a and 92b is provided with an apertured lower end portion which slides over the mounting pins 100, 102, and 104 respectively. Spring clips 106 serve to hold the support bars in place on the mounting pins against stop collars 108 in the same manner described above with respect to the detachable mounting of support bars 20, 39, and 40. Mounting pin 100 for front support bar 86 is attached to a mounting plate 110 secured to the front frame of the snowmobile in the same manner as mounting plate 28 for support bar 20 of the embodiment of FIGS. 1 through 5. Mounting plates 112 and 114 for support bars 96, 98, 92a and 92b are removably secured to the front and rear end portions respectively of snowmobile running boards 48 by through bolts.

Front support bar 86 of the protective frame structure shown in FIGS. 6 through 8 serves to either break or deflect obstructions in the path of the snowmobile. Such non-severable obstructions as heavy cable and large tree limbs will be deflected upwardly to portion 86a of support bar 86, and then guided rearwardly by transverse bar 88 and roll bars 90 and 92 over the heads of the riders on the snowmobile. If the snowmobile should tip or roll over, overhead roll bars 90 and 92 and the cooperating cross braces 88, 93, 94 and 95 will strike the ground and prevent the passengers from being crushed against the ground by the snowmobile.

In place of the single, front support bar 86 which I have described above, a pair of forwardly extending support bars could be utilized at opposite sides of snowmobile hood 2. Such a pair of front support bars would be connected at their upper ends to the opposite end portions of transverse support bar 88 and would extend forwardly and downwardly over the snowmobile hook in the same manner as single support bar 86. Also, side bumper bars could be secured between support legs 96, 98 and front support bar 86 in substantially the same manner as shown for bumper bars 64 in FIGS. 1, 2 and 4.

Those skilled in the art will appreciate that other changes and modifications may be made in the protective devices for snowmobiles which I have shown and described, without departing from the spirit and scope of my invention as defined in the following claims.

What is claimed is:

1. In combination with a snowmobile having a front hood, a windshield projecting upwardly therefrom and a driver and passenger seat behind said windshield, a protective guard device for the riders on said snowmobile comprising:

a vertically extending, hooked member opening towards the front end of said snowmobile and having a forwardly facing cutting edge thereon;

support means attached to said hooked member and serving to hold said hooked member at a position over said hood and in front of said windshield, said support means including mounting bar means extending downwardly from said hooked member and removably secured to said snowmobile, and said hooked member being pivotally mounted on said mounting bar means at a pivot joint which permits said hooked member to pivot forwardly about a substantially horizontal axis.

* * * * *